(12) United States Patent
de Leon

(10) Patent No.: US 8,139,083 B2
(45) Date of Patent: Mar. 20, 2012

(54) CUSTOM IMAGE FRAMES

(75) Inventor: David de Leon, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 618 days.

(21) Appl. No.: 11/463,434

(22) Filed: Aug. 9, 2006

(65) Prior Publication Data
US 2008/0036789 A1 Feb. 14, 2008

(51) Int. Cl.
G09G 5/00 (2006.01)
(52) U.S. Cl. .......................... 345/619; 345/626; 345/629
(58) Field of Classification Search .................. 345/626, 345/629, 660, 619
See application file for complete search history.

(56) References Cited

U.S. PATENT DOCUMENTS

| 5,319,742 | A  | * | 6/1994  | Edgar | 345/601 |
|-----------|----|---|---------|-------|---------|
| 5,402,170 | A  | * | 3/1995  | Parulski et al. | 348/211.6 |
| 5,986,670 | A  | * | 11/1999 | Dries et al. | 345/629 |
| 6,069,637 | A  | * | 5/2000  | Gaglione et al. | 345/629 |
| 6,621,524 | B1 | * | 9/2003  | Yamamoto et al. | 348/584 |
| 7,209,149 | B2 | * | 4/2007  | Jogo | 345/622 |
| 2001/0048447 | A1 | * | 12/2001 | Jogo | 345/620 |
| 2003/0206316 | A1 | * | 11/2003 | Anderson et al. | 358/1.18 |
| 2005/0219384 | A1 | * | 10/2005 | Herberger et al. | 348/239 |
| 2006/0140508 | A1 | * | 6/2006 | Ohgishi et al. | 382/284 |
| 2006/0174194 | A1 | * | 8/2006 | Miyazawa | 715/517 |
| 2007/0057971 | A1 | * | 3/2007 | Bychkov et al. | 345/629 |

FOREIGN PATENT DOCUMENTS

| CN | 1706181 | | 12/2005 |
| EP | 0 853 426 A2 | | 7/1998 |
| JP | 01177764 | * | 6/2001 |

OTHER PUBLICATIONS

Dayton et al. "The photoshop 5/5.5 wow! book", 2000, Peachpit Press, p. 25-26, 47-48, 66-67, 76, 84-85.*
Dayton et al. "The photoshop 5/5.5 wow! book", 2000, Peachpit Press, p. 62-63.*
International Search Report/Written Opinion for corresponding PCT Application No. PCT/IB2007/050434, dated Jun. 12, 2007.
International Preliminary Report on Patentability for corresponding international application No. PCT/IB2007/050434, dated Nov. 12, 2008, 7 pages.
Heico Neumeyer; "Adobe Photoshop CS"; Markt+Technik Verlag, Munchen, Germany; 2004; pp. 814-815, English Translation.

* cited by examiner

Primary Examiner — Michelle K Lay
(74) Attorney, Agent, or Firm — Snyder, Clark, Lesch & Chung, LLP

(57) ABSTRACT

A method includes retrieving an image stored on a device, creating a mask in a portion of the image, and creating a custom image frame from the image and the mask.

13 Claims, 18 Drawing Sheets

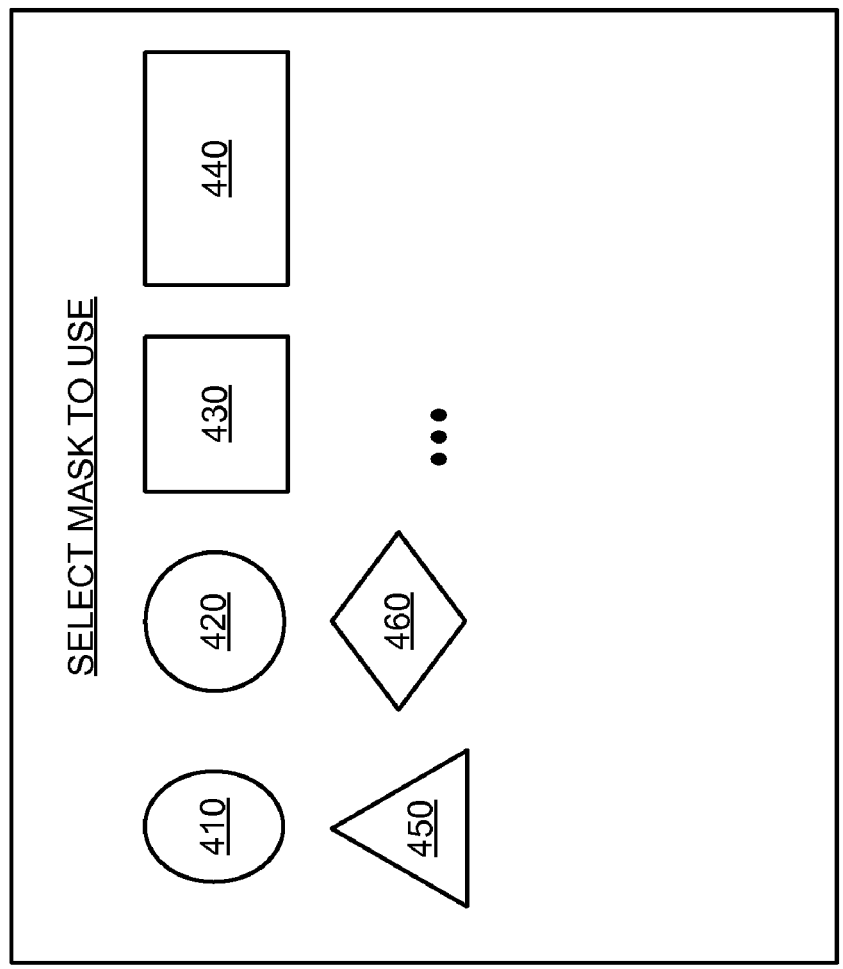

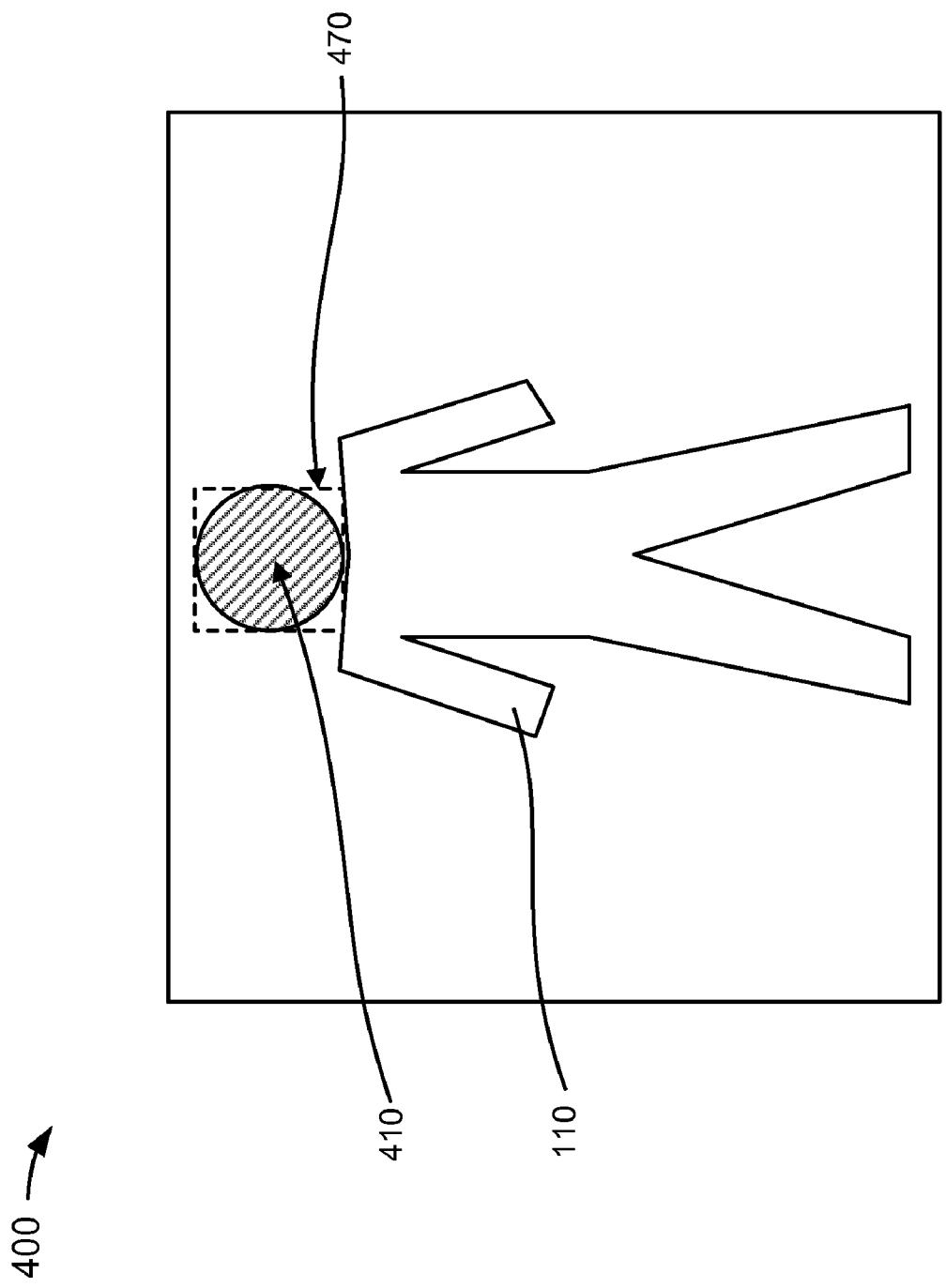

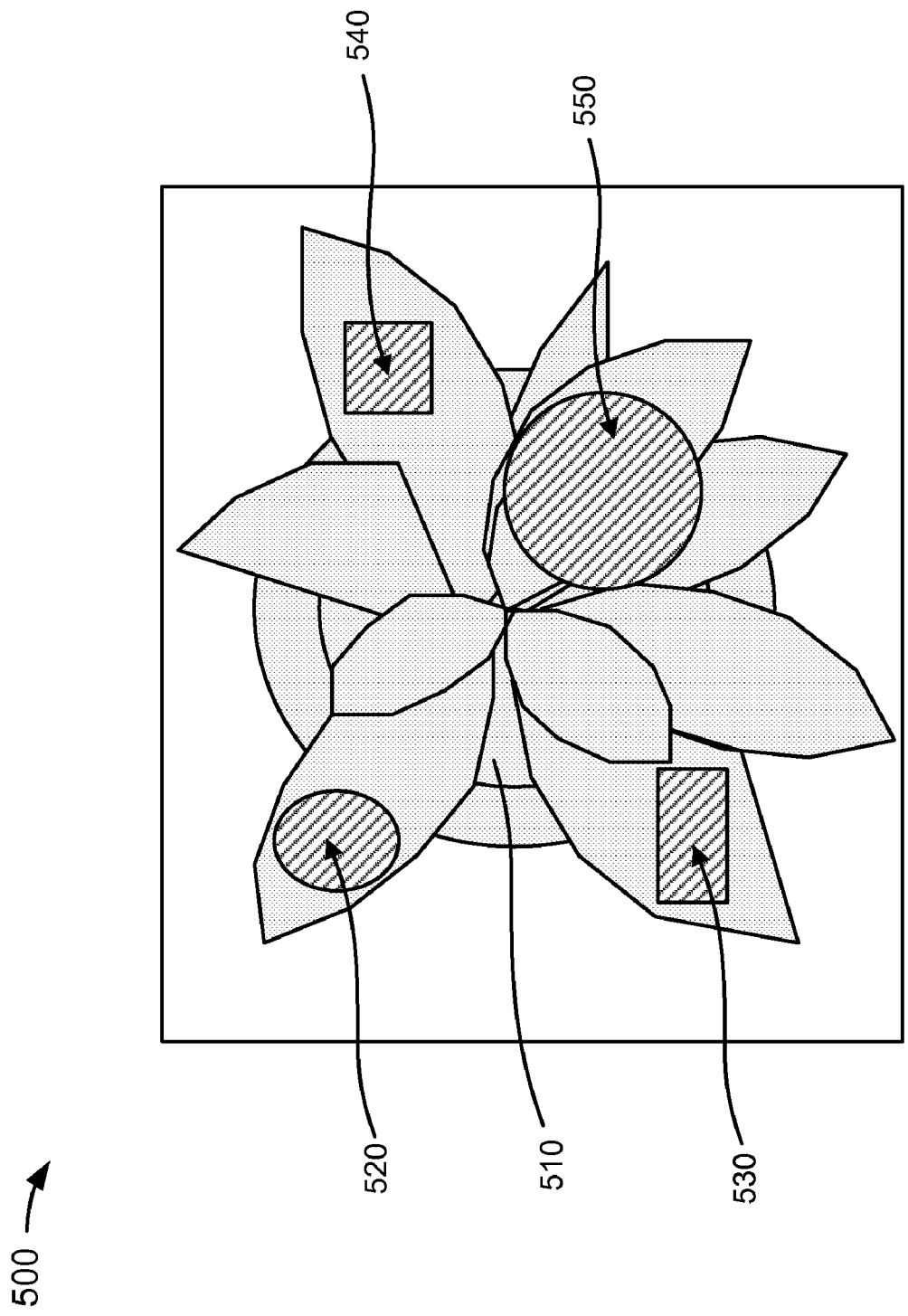

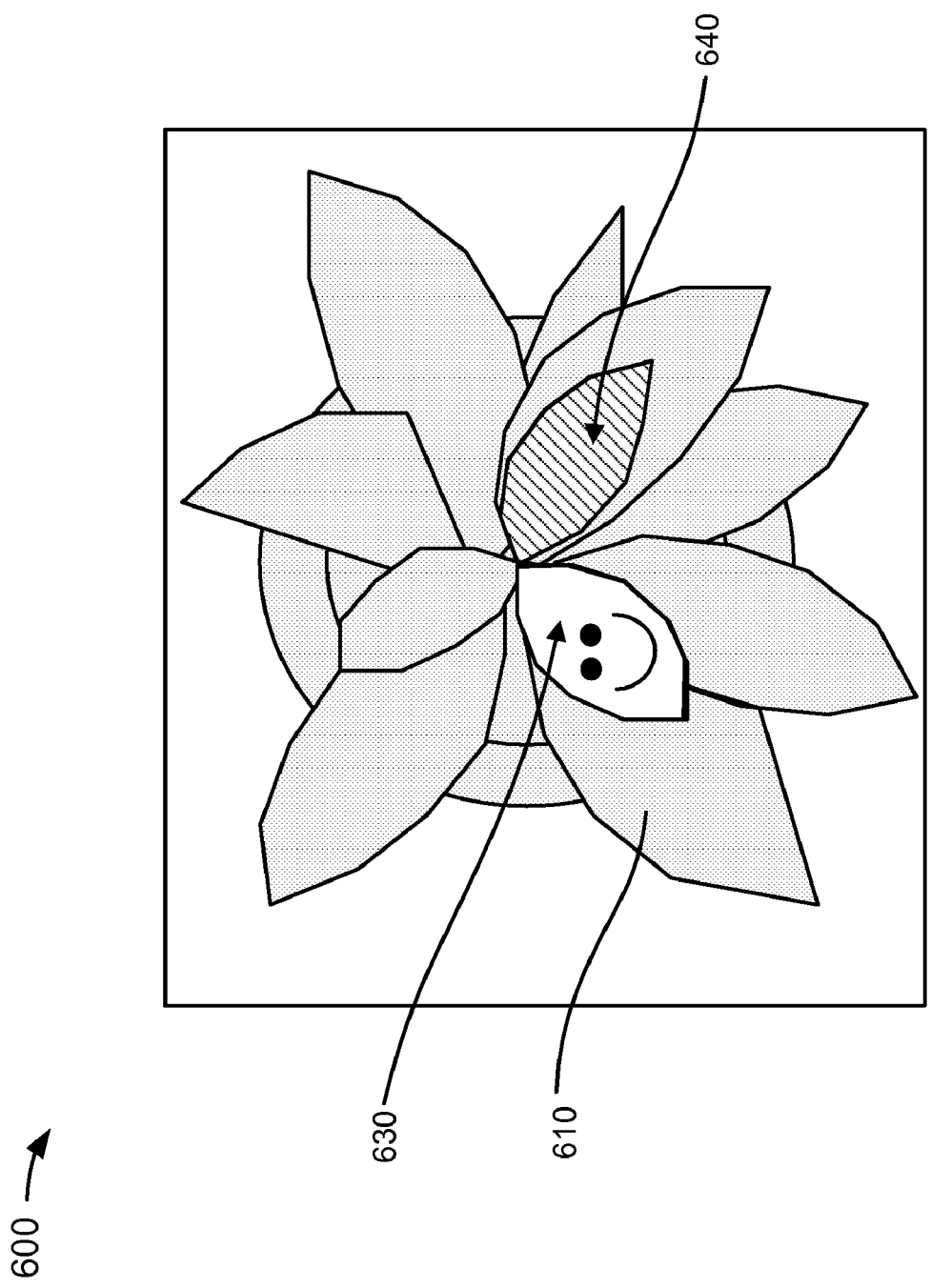

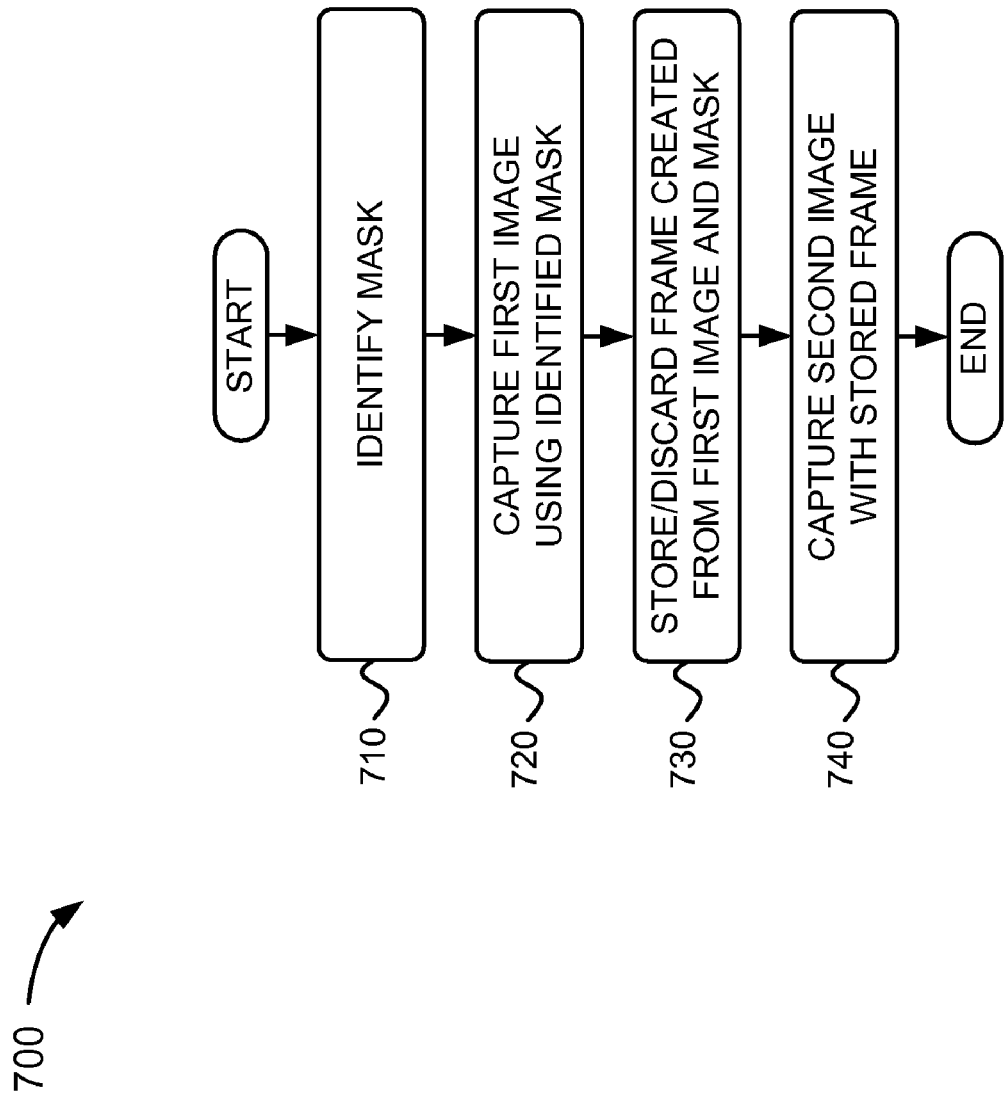

CUSTOM IMAGE FRAMES

BACKGROUND

1. Field of the Invention

Implementations described herein relate generally to devices and, more particularly, to a device that creates custom image frames.

2. Description of Related Art

A camera application for a device (e.g., a mobile communication device) may come with a number of pre-stored image frames that may be used to create fun images. For example, some pre-stored image frames may permit a user to adorn an image in a number of fanciful ways.

SUMMARY

According to one aspect, a method may include selecting a mask with a device, enabling alignment of the selected mask with a portion of a first image, and capturing the first image and the aligned mask to create a custom image frame.

Additionally, the method may include retrieving a second image with the device using the custom image frame.

Additionally, the second image may be aligned with the masked portion of the first image.

Additionally, the mask may be selected from multiple predetermined masks.

Additionally, the mask may have a predetermined shape.

Additionally, the predetermined shape may be at least one of an ellipse, a circle, a square, a rectangle, a triangle, a diamond, or a polygon.

Additionally, the mask may be capable of being resized.

Additionally, the mask may be capable of being reshaped.

Additionally, the mask may be capable of being created by a user of the device.

Additionally, the method may include storing the custom image frame in the device.

Additionally, the method may include transmitting the custom image frame with the device to another device.

Additionally, the device may include a camera.

According to another aspect, a method may include retrieving a first image stored on a device, creating a mask in a portion of the first image, and creating a custom image frame from the first image and the mask.

Additionally, the method may include retrieving a second image stored on the device, and combining the second image with the custom image frame.

Additionally, the second image may be provided within the masked portion of the first image.

Additionally, the second image may be automatically resized to fit within the masked portion of the first image.

Additionally, the method may include storing the custom image frame in the device.

Additionally, the method may include transmitting the custom image frame with the device to another device.

Additionally, the mask may be capable of being resized.

Additionally, the mask may be capable of being reshaped.

According to yet another aspect, a method may include retrieving an image with a device, creating multiple masks in portions of the image, and creating a custom image frame from the image and the multiple masks.

Additionally, the method may include retrieving multiple secondary images, providing each of the secondary images within a corresponding one of the multiple masks, and creating a composite image from the custom image frame and the multiple secondary images.

Additionally, the method may include selecting one of the multiple masks for receipt of one of the multiple secondary images.

Additionally, the method may include automatically resizing each of the secondary images to fit within its corresponding selected mask.

Additionally, the method may include automatically reshaping each of the secondary images to fit within its corresponding selected mask.

Additionally, the method may include storing the custom image frame in the device.

Additionally, the method may include transmitting the custom image frame with the device to another device.

According to a further aspect, a device may include means for selecting a mask with a device, means for retrieving an image with the device, means for enabling alignment of the selected mask with a portion of the image, and means for creating a custom image frame from the image and the selected mask.

According to still another aspect, a device may include means for retrieving an image stored on a device, means for creating a mask in a portion of the image, and means for creating a custom image frame from the image and the mask.

According to a still further aspect, a camera may include a memory to store instructions, and a processor to execute the instructions. The processor may select a mask, view an object with the camera, enable alignment of the selected mask with a portion of the object, and capture the object and the aligned mask with the camera to create a custom image frame.

According to another aspect, a device may include a memory to store instructions, and a processor to execute the instructions. The processor may retrieve a first image, create a mask in a portion of the first image, create a custom image frame from the first image and the mask, and at least one of transmit or store the custom image frame.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 7 and 8 are flowcharts of exemplary processes according to implementations consistent with principles of the invention.

DETAILED DESCRIPTION

The following detailed description of the invention refers to the accompanying drawings. The same reference numbers in different drawings may identify the same or similar elements. Also, the following detailed description does not limit the invention.

Implementations consistent with principles of the invention may relate to custom image frame creation with a camera application of a device. In one implementation, the camera application may provide a user with a quick, simple, and reliable mechanism for creating custom image frames with a device. For example, a user may select a mask to use for image frame creation, and may use the device to retrieve media (e.g., an image) from storage or with another mechanism (e.g., by taking a picture). A portion of the retrieved image may be masked with the selected mask to permit a user to create a custom image frame from the retrieved image. The custom image frame may be stored, and may be used to create additional images in a similar way pre-stored frames are used to create images. In another implementation, a mask may be provided in an existing image, and the resulting image may be a first custom image frame. The first custom image frame may be shared with multiple users, and manipulated by each additional user to create a collaborative custom image frame and/or custom image.

An "image frame," as the term is used herein, is to be broadly interpreted to include any machine-readable and machine-storable work product, document, electronic media, etc. An image frame may include, for example, an image with a masked portion(s), a video with a masked portion(s), an animation with a masked portion(s), etc.

A "device," as the term is used herein, is to be broadly interpreted to include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a camera (e.g., video and/or still image camera), a sound recorder (e.g., a microphone), a Doppler receiver, and/or global positioning system (GPS) receiver; a laptop; a GPS device; a camera (e.g., video and/or still image camera); a sound recorder (e.g., a microphone); and any other computation or communication device capable of displaying media, such as a personal computer, a home entertainment system, a television, etc.

Figure 1:
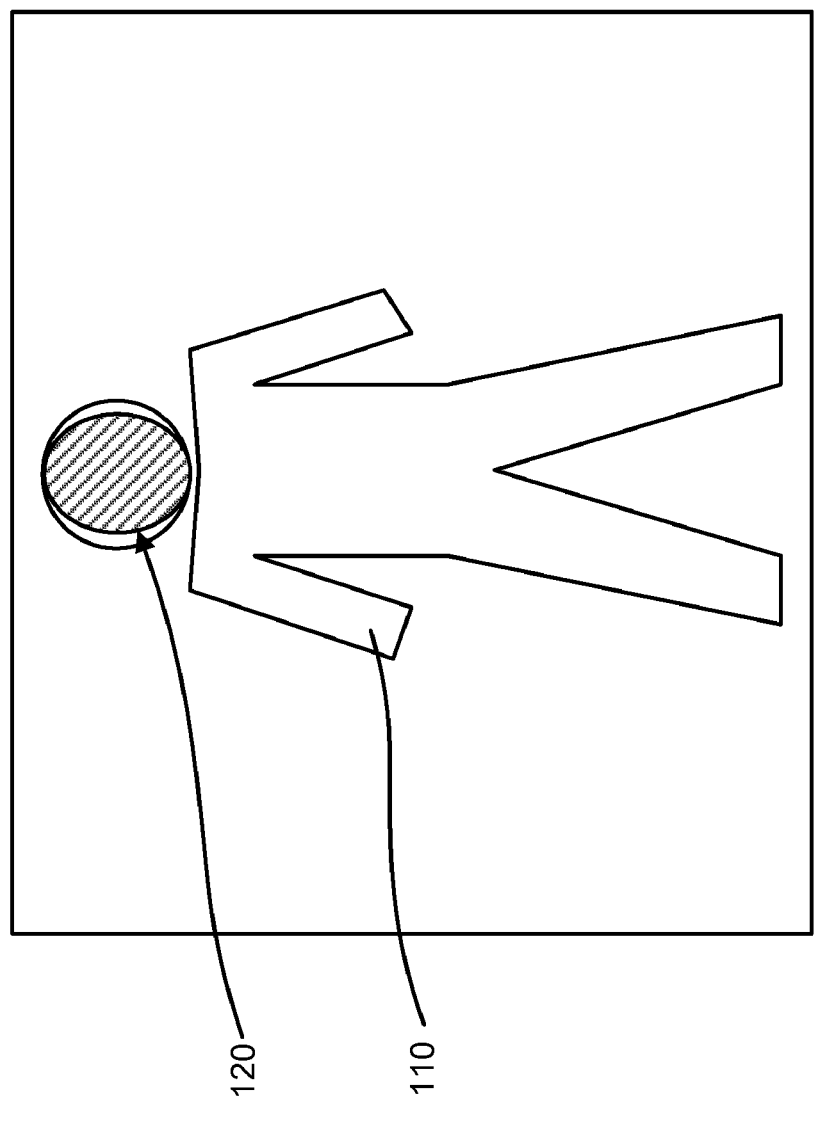
FIG. 1 is an exemplary diagram illustrating concepts consistent with principles of the invention.

FIG. 1 is an exemplary diagram illustrating concepts consistent with principles of the invention. As shown in FIG. 1, a display 100 of a device may include an image, an image from a video, and/or an animation (collectively referred to hereinafter as "image") 110 of a subject being viewed by a camera of the device. For example, in one implementation, image 110 may be a picture of a person currently being displayed on display 100. A user may select a mask 120, and display 100 may include the selected mask 120. Mask 120 may be positioned over a portion of the subject of image 110. For example, if the subject currently being displayed on display 100 is a person, mask 120 may be positioned to cover a face of the person, as shown in FIG. 1. Once the position of mask 120 is set over a portion of the subject of image 110, the combination of image 110 and mask 120 may be used to create a custom image frame, as described in more detail below.

Exemplary Device Architecture

Figure 2:
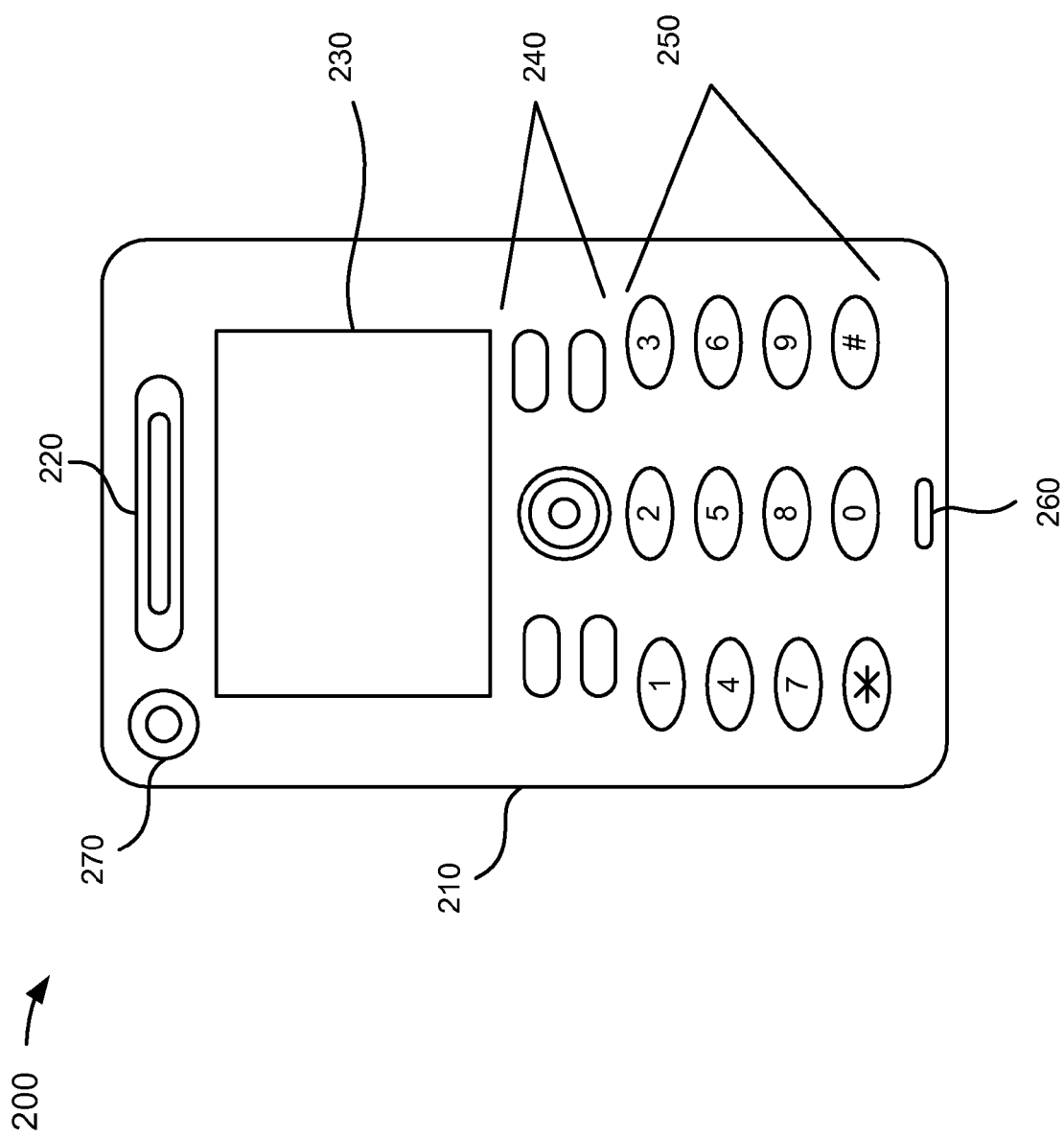
FIG. 2 is a diagram of an exemplary device in which systems and methods consistent with principles of the invention may be implemented.

FIG. 2 is a diagram of an exemplary device 200 according to an implementation consistent with principles of the invention. As shown in FIG. 2, device 200 may include a housing 210, a speaker 220, a display 230, control buttons 240, a keypad 250, a microphone 260, and a camera 270. Housing 210 may protect the components of device 200 from outside elements. Speaker 220 may provide audible information to a user of device 200. Display 230 may provide visual information to the user. For example, display 230 may provide information regarding incoming or outgoing calls, media, games, phone books, the current time, etc. In an implementation consistent with principles of the invention, display 230 may provide the user with the ability to create custom image frames. Control buttons 240 may permit the user to interact with device 200 to cause device 200 to perform one or more operations. Keypad 250 may include a standard telephone keypad. Microphone 260 may receive audible information from the user. Camera 270 may enable a user to capture and store video and/or images (e.g., pictures).

Figure 3:
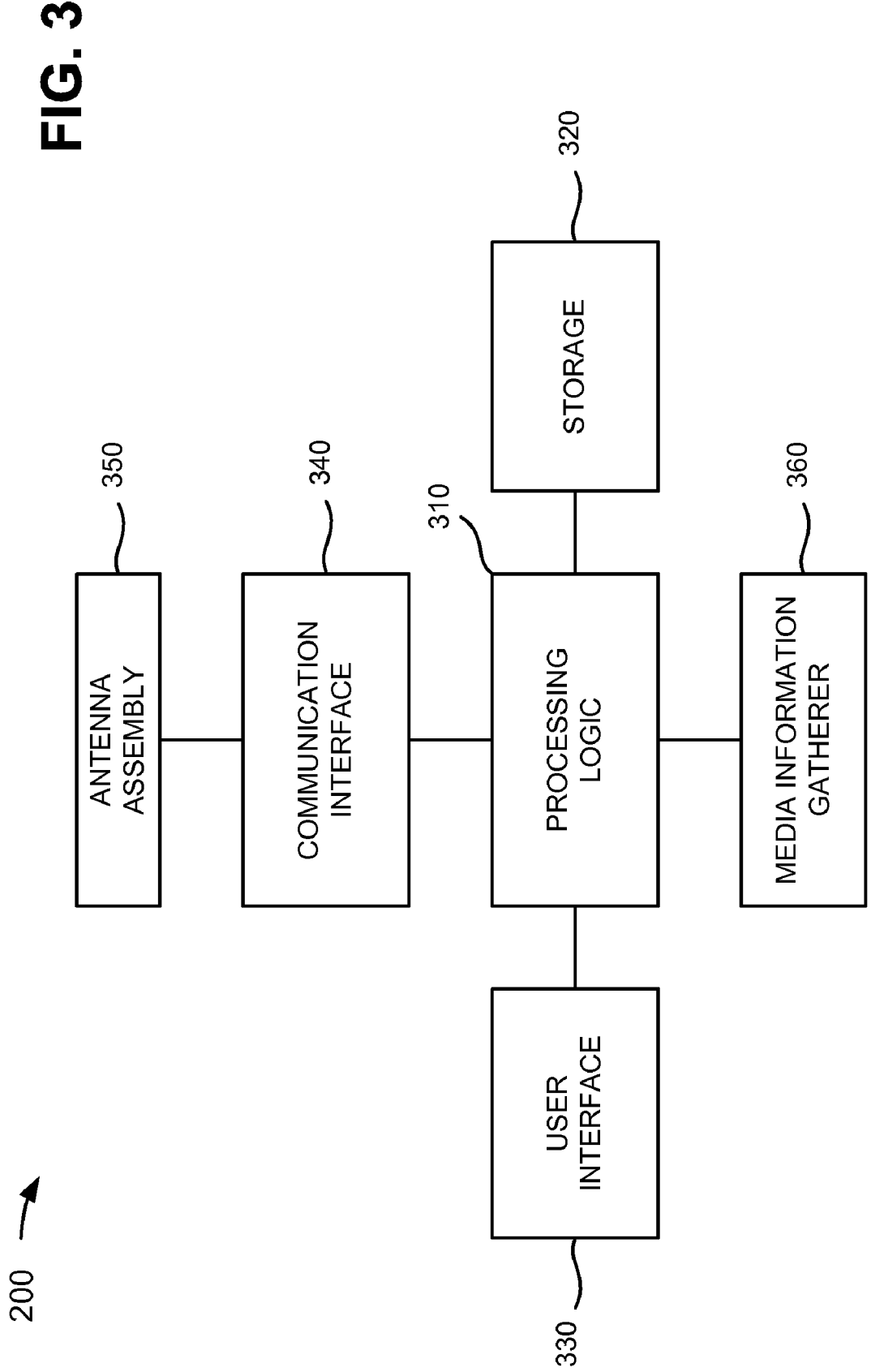
FIG. 3 is a diagram of exemplary components of the exemplary device of FIG. 2.

Although FIG. 2 shows exemplary components of device 200, in other implementations, device 200 may include additional or fewer components. For example, device 200 may include a touch screen (e.g., display 230 may be a touch screen) that may permit the user to interact with device 200 to cause device 200 to perform one or more operations. The touch screen may be manipulated by touching or stroking the display with a pen or a finger FIG. 3 is a diagram of exemplary components of device 200. As shown in FIG. 3, device 200 may include processing logic 310, storage 320, a user interface 330, a communication interface 340, an antenna assembly 350, and a media information gatherer 360. Processing logic 310 may include a processor, microprocessor, an application specific integrated circuit (ASIC), field programmable gate array (FPGA), or the like. Storage 320 may include a random access memory (RAM), a read only memory (ROM), and/or another type of memory to store data and instructions that may be used by processing logic 310 to control operation of device 200 and its components.

User interface 330 may include mechanisms for inputting information to device 200 and/or for outputting information from device 200. Examples of input and output mechanisms might include a speaker (e.g., speaker 220) to receive electrical signals and output audio signals, a camera (e.g., camera 270) to receive image and/or video signals and output electrical signals, a microphone (e.g., microphone 260) to receive audio signals and output electrical signals, buttons (e.g., a joystick, control buttons 240 and/or keys of keypad 250) to permit data and control commands to be input into device 200, a display (e.g., display 230) to output visual information (e.g., information from camera 270), and/or a vibrator to cause device 200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air. Antenna assembly 350 may receive RF signals from communication interface 340 and transmit them over the air and receive RF signals over the air and provide them to communication interface 340. In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks).

Media information gatherer 360 may obtain media information from device 200. In one implementation, the media information may correspond to media stored on device 200 or received by device 200 (e.g., by communication interface 340). In this case, media information gatherer 360 may include a media storage device (e.g., storage 320), or a communication device (e.g., communication interface 340) capable of receiving media from another source (e.g., wired or wireless communication with an external media storage device). In another implementation, the media information may correspond to media captured or retrieved by device 200. In this case, media information gatherer 360 may include a microphone (e.g., microphone 260) that may record audio information, and/or a camera (e.g., camera 270) that may record images, animations, and/or videos. The captured media may or may not be stored in a media storage device (e.g., storage 320).

As will be described in detail below, device 200, consistent with principles of the invention, may perform certain operations relating to custom image frames creation. Device 200 may perform these operations in response to processing logic 310 executing software instructions of an application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Custom Image Frames Creation Mechanisms

FIGS. 4A-6D are diagrams of exemplary custom image frames creation mechanisms according to implementations consistent with principles of the invention. The methods of FIGS. 4A-6D may be conveyed on device 200 (e.g., on display 230 of device 200).

Custom Image Frame Creation

Figure 4B:
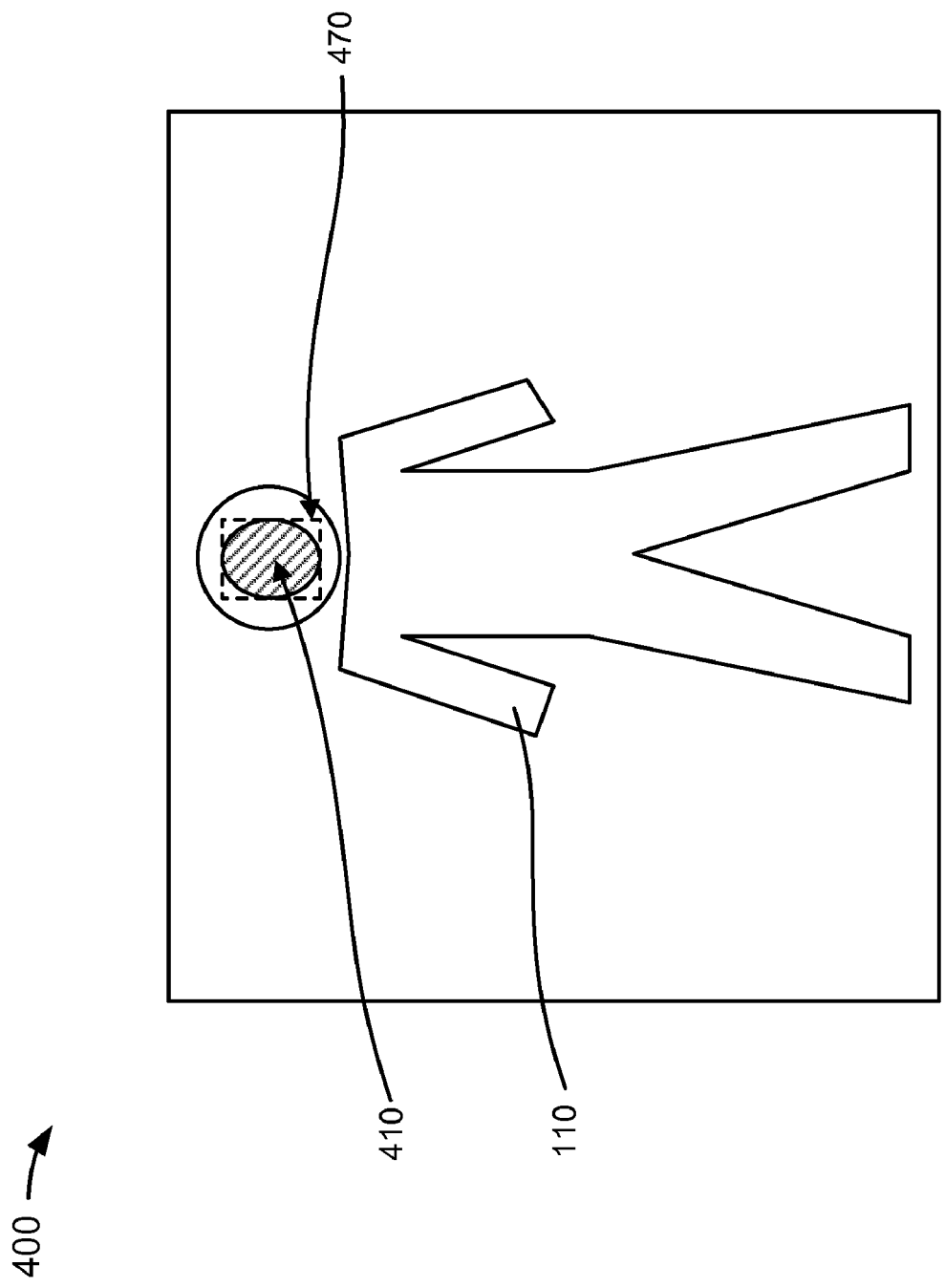
FIGS. 4A-6D are diagrams of exemplary custom image frame creation mechanisms according to implementations consistent with principles of the invention.

As shown in FIG. 4A, a display 400 of a device (e.g., display 230 of device 200) may display multiple masks (e.g., masks 410-460) that may be selected for creating a custom image frame. The masks may be a variety of shapes and sizes. For example, the masks may be in the shape of an ellipse (e.g., mask 410), a circle (e.g., mask 420), a square (e.g., mask 430), a rectangle (e.g., mask 440), a triangle (e.g., mask 450), a diamond (e.g., mask 460), a polygon, etc. In some implementations consistent with principles of the invention, device 200 may allow a user to create masks in any desired configuration. For example, device 200 may provide the user with a freestyle drawing tool that allows the user to create custom masks. In one implementation, the size of each mask may be predetermined based on the size of display 400 of the device. In another implementation, the size of each mask may be adjusted by the user in order to mask as much or as little of the image as desired by the user. For example, as shown in FIG. 4B, mask 410 may be provided over a face of an image 110 provided on display 400. Mask 410, however, may be too small to cover the entire face of the subject. A mechanism (e.g., a resizing box 470 controlled by a joystick, a touch screen, control buttons 240 and/or keys of keypad 250) may be provided to resize mask 410. Resizing box 470 may enable a user to enlarge or reduce the size of mask 410 (or even change a single dimension of the mask, such as the width) to cover the desired portion of image 110 (e.g., the face of the subject). For example, as shown in FIG. 4C, resizing box 470 may be manipulated to enlarge the size of mask 410 so that mask covers the face of the subject displayed as image 110.

In one implementation, image 110 may be a representation of a subject currently being viewed by a camera (e.g., camera 270) of the device. In another implementation, image 110 may be retrieved from storage (e.g., storage 320) of the device and provided on display 400.

Figure 4D:
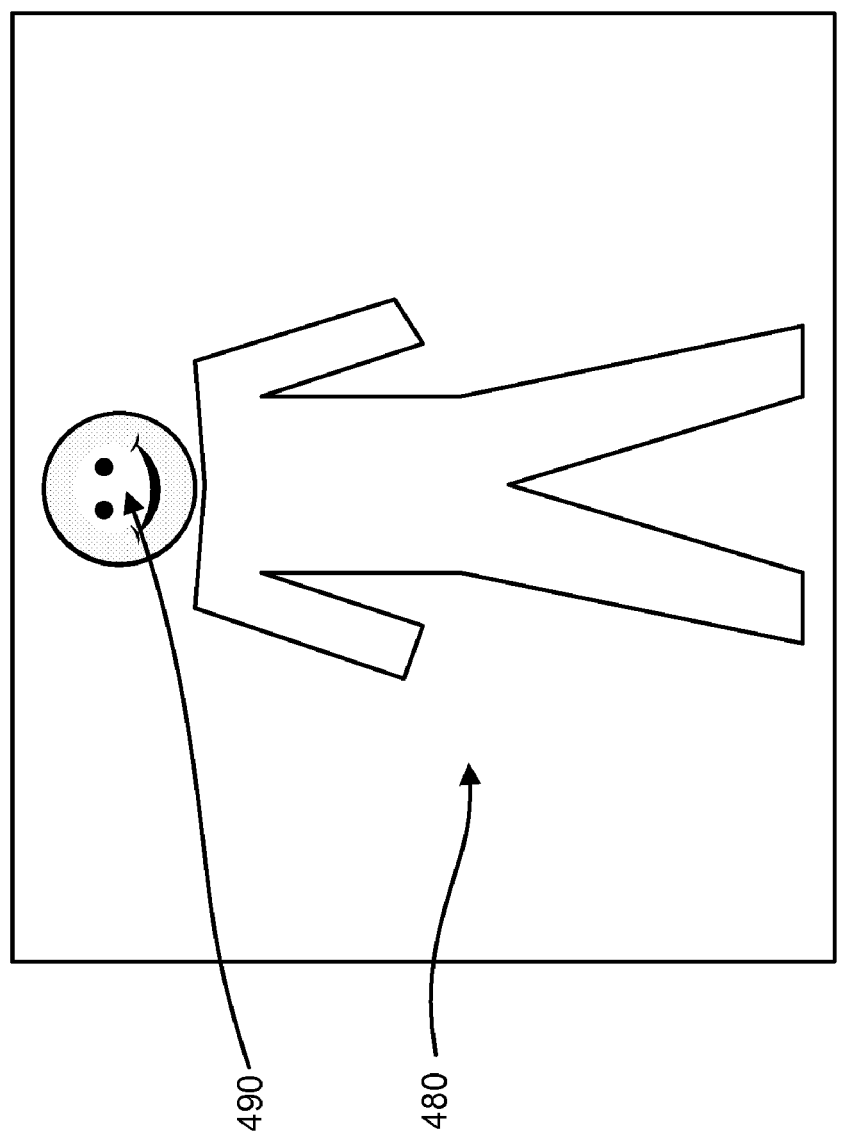

A custom image frame 480 may be created from the combination of image 110 and positioned mask 410 (e.g., by taking a picture of the subject with camera 270 of device 200). A user may be given the options of discarding custom image frame 480, storing custom image frame 480 (e.g., within storage 320 of device 200), and/or taking another picture using custom image frame 480. For example, in one implementation, custom image frame 480 may be combined with another image 490 (e.g., by taking another picture with camera 270 of device 200) to create a final image, as shown in FIG. 4D. Image 490 may be retrieved by the device from storage (e.g., storage 320), or may be retrieved by another mechanism (e.g., by taking a picture with camera 270). In another implementation, custom image frame 480 may be used to create additional images in a similar way pre-stored frames are used to create images. Once image 490 is combined with customer image frame 480, a user may be given the options of discarding the resulting image, saving the resulting image, and/or attempting to capture a different image to be combined with custom image frame 280.

In one example, a user may select a mask and take a picture of friend A (e.g., with camera 270 of device 200), using the mask to block the face of friend A. The resulting custom image frame (e.g., faceless friend A) may be used to take a picture of a face of friend B (e.g., with camera 270 of device 200). The resulting image (e.g., an image of friend A's body, with friend B's face) may be saved (e.g., within storage 320 of device 200).

Custom Image Frame with Multiple Masks

Figure 5A:
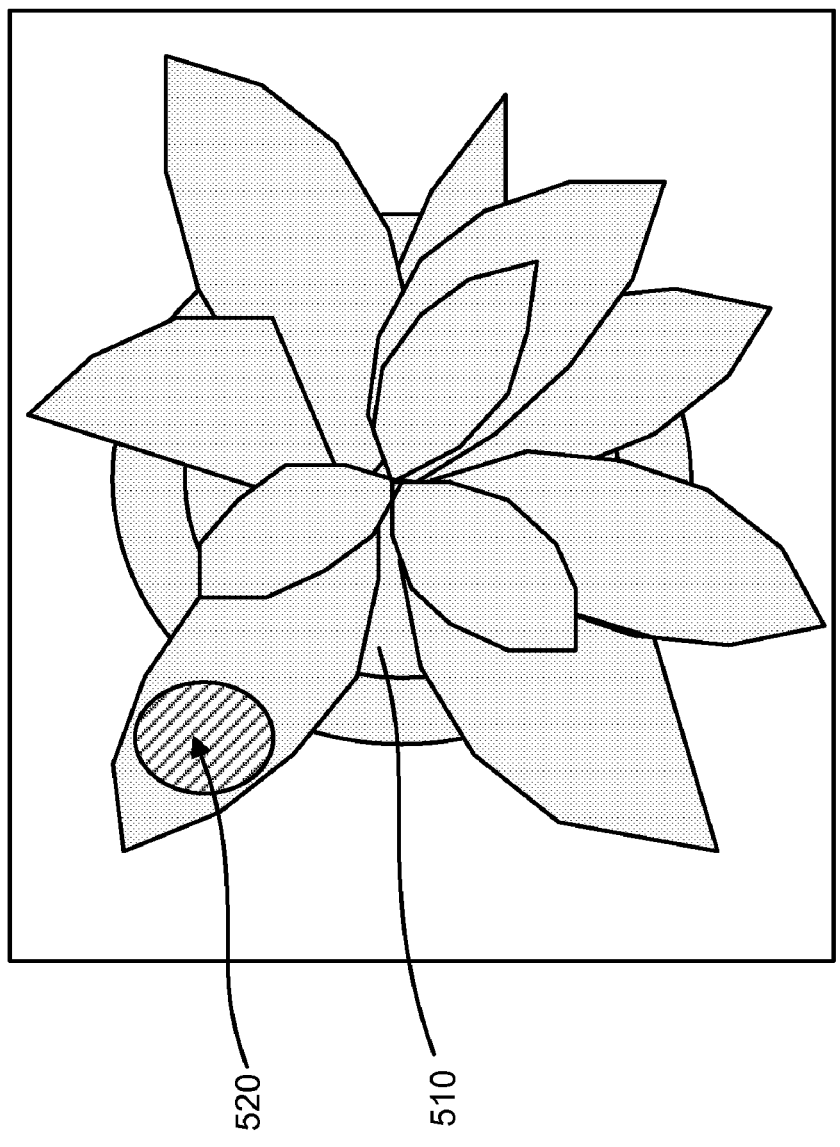

Although FIGS. 4A-4D show a single mask being used to create a custom image frame, in one implementation consistent with principles of the invention, multiple masks may be used with a single image to create a custom image frame with multiple masks. As shown in FIG. 5A, a display 500 of a device (e.g., display 230 of device 200) may display an image 510. In one implementation, image 510 may be a representation of an object currently being viewed by a camera (e.g., camera 270) of the device. In this example, the object is a flower. In another implementation, image 510 may be retrieved from storage (e.g., storage 320) of the device and provided on display 500. A mask 520 may be provided over a portion of image 520, as further shown in FIG. 5A. Mask 520 may be selected from a variety of shapes and may be resized as described above in connection with FIGS. 4A-4D.

As shown in FIG. 5B, additional masks 530-550 may be provided over portions of image 520. Masks 530-550 may be selected from a variety of shapes and may be resized as described above in connection with FIGS. 4A-4D. Although FIG. 5B shows four masks (e.g., masks 520-550) being displayed, more or less than four masks may be provided with image 510. Once the masks are provided with image 510, the resulting image may be considered a custom image frame. A user may be given the options of discarding the custom image frame, storing the custom image frame (e.g., within storage 320 of device 200), and/or taking a picture(s) using the custom image frame.

Figure 5C:
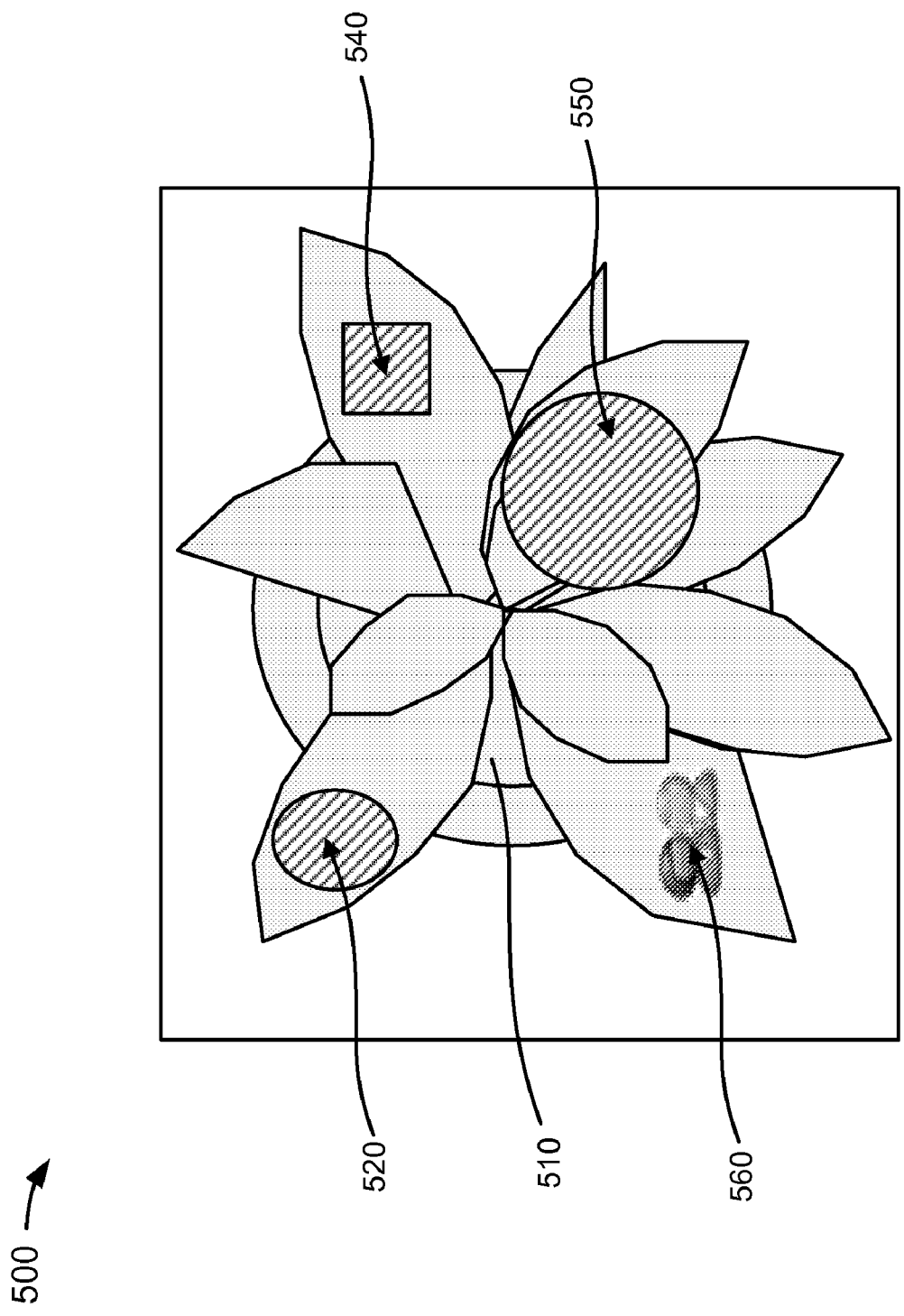

If the user takes a picture using the custom image frame, a user may align a mask (e.g., one of masks 520-550) with an object and capture an image of the object. For example, as shown in FIG. 5C, mask 530 of the custom image frame of FIG. 5B may be aligned with the object, and an image 560 of the subject may be captured where mask 530 (FIG. 5B) was originally provided. In another implementation, image 560 may be stored on the device (e.g., within storage 320 of device 200) and may be provided within one of the masks (e.g., masks 520-550). A user may select which mask of masks 520-550 within which to provide image 560. Image 560 may be resized and/or reshaped to fit within the user-defined mask. For example, image 560 may be larger in size and/or shaped differently than mask 530, and may be reduced in size and/or reshaped to fit within mask 530. Alternatively, image 560 may be smaller in size and/or shaped differently than mask 530, and may be enlarged in size and/or reshaped to fit within mask 530. The resizing and/or reshaping of image 560 may be performed by the user (e.g., by manipulating the size and/or shape of image 560 with a joystick, a touch screen, control buttons 240 and/or keys of keypad 250), and/or may be automatically performed by the device.

Figure 5D:
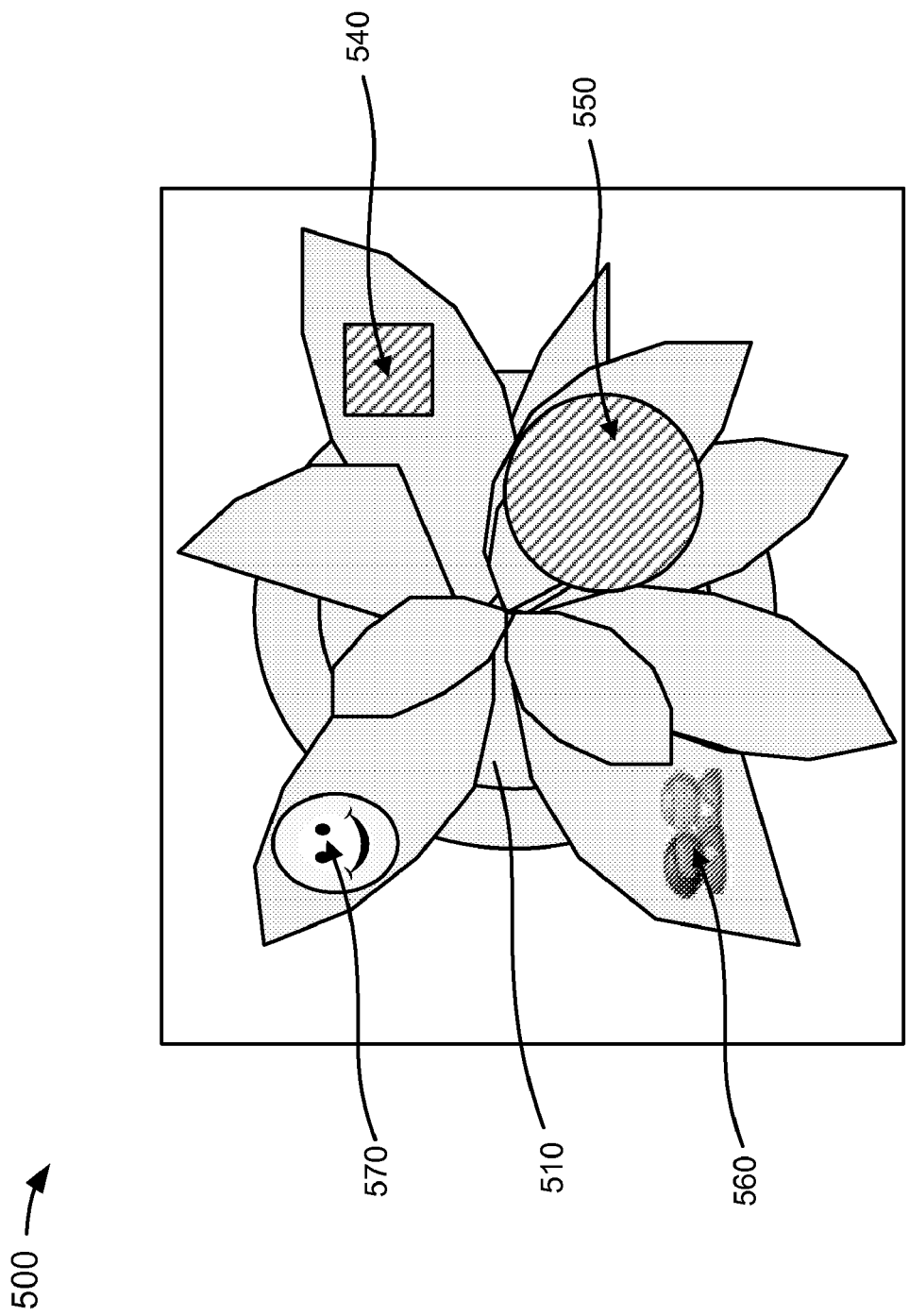
Figure 5E:
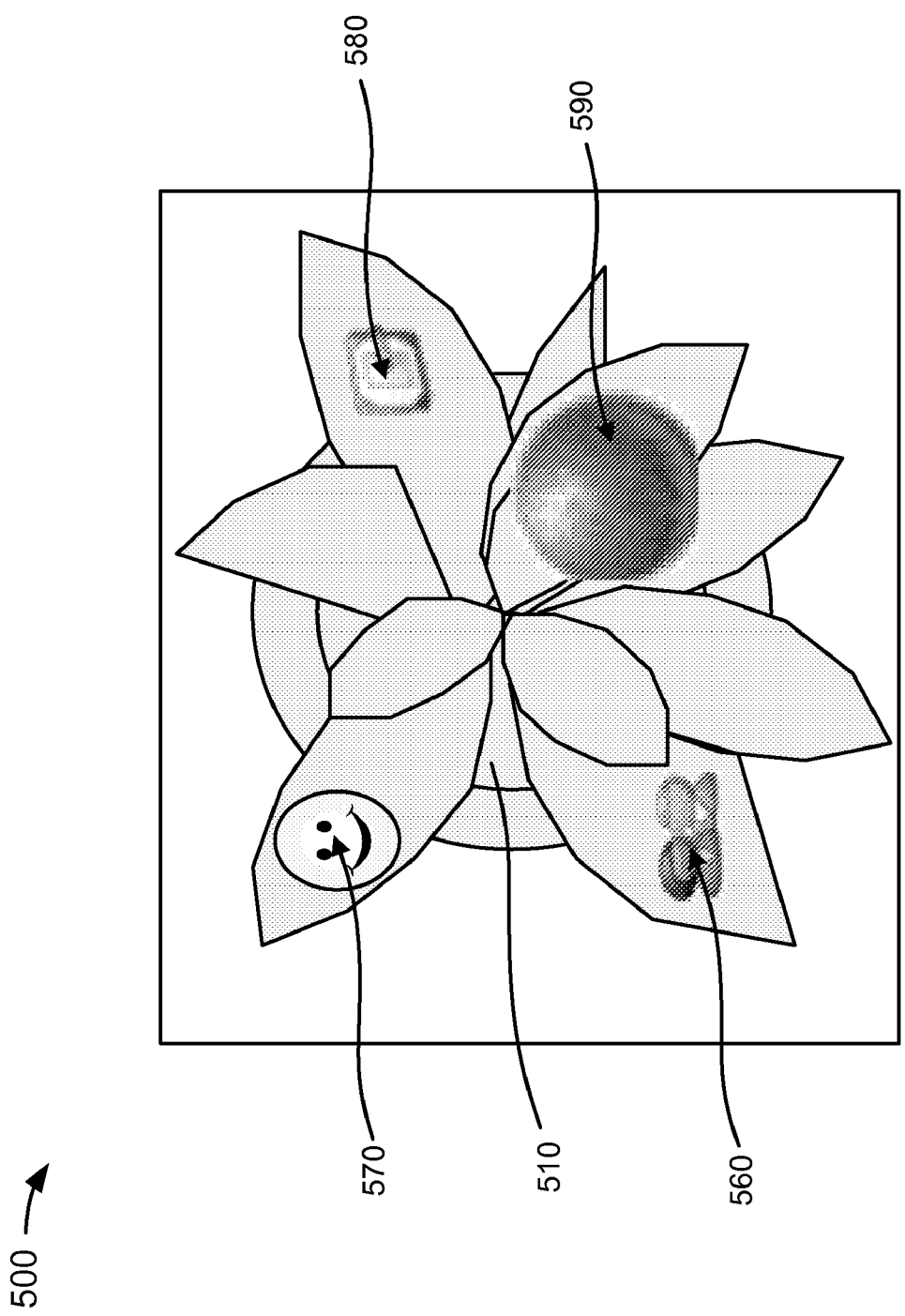

A user may continue to add images to the remaining masks (e.g., masks 520, 540, and 550) as described above in connection with FIG. 5C. For example, as shown in FIG. 5D, mask 520 may be aligned with an object, and an image 570 of the object may be captured where mask 520 was originally provided. In another implementation, image 570 may be stored on the device (e.g., within storage 320 of device 200) and may be provided within one of the masks (e.g., masks 520, 540, and/or 550). A user may select which mask of masks 520, 540 and/or 550 within which to provide image 570. Image 570 may be resized and/or reshaped to fit within the user-defined mask. As shown in FIG. 5E, masks 540 and 550 may be aligned with objects, and images 580 and 590, respectively, of the objects may be captured where masks 540 and 550 were originally provided. In another implementation, images 580 and 590 may be stored on the device (e.g., within storage 320 of device 200) and may be provided within the masks (e.g., masks 540 and 550, respectively). A user may select which mask of masks 540 and/or 550 within which to provide images 580 and 590. Images 580 and/or 590 may be resized and/or reshaped to fit within the user-defined mask.

Custom Image Frames with User Created Masks

Figure 6A:
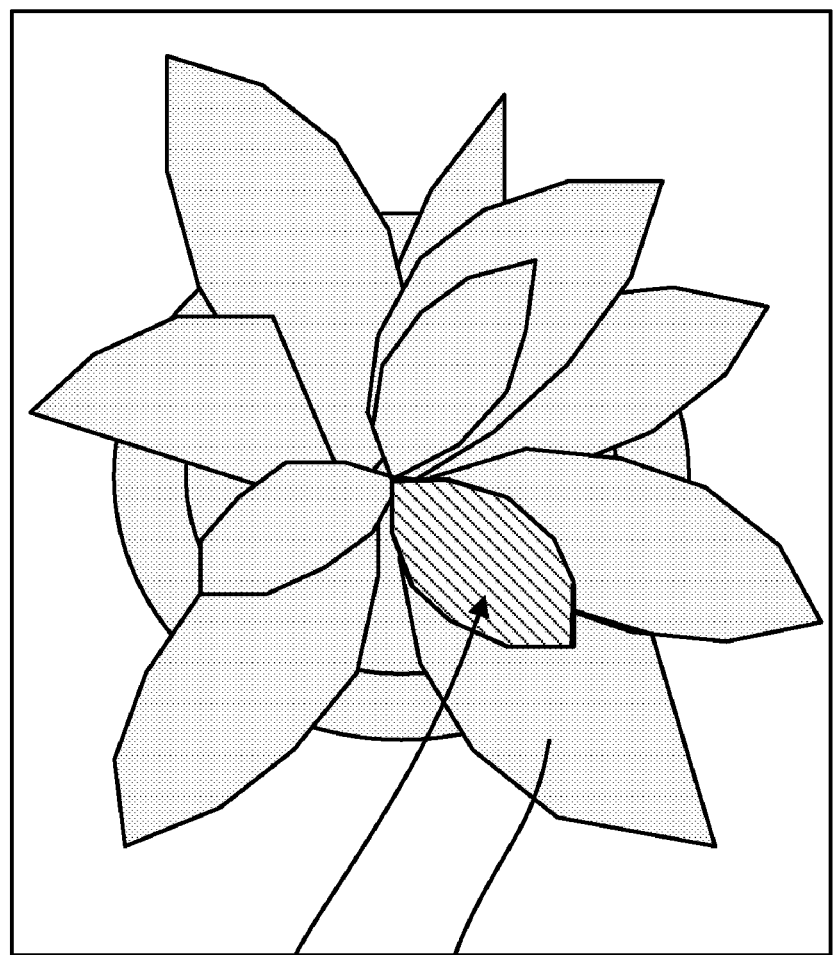

Although FIGS. 4A-5E show creation of custom image frames from predetermined masks, in one implementation consistent with principles of the invention, user created masks may be utilized to create custom image frames. For example, as shown in FIG. 6A, a display 600 of a device (e.g., display 230 of device 200) may display an image 610. In one implementation, image 610 may be a representation of an object (e.g., a flower) currently being viewed by a camera (e.g., camera 270) of the device. In another implementation, image 610 may be retrieved from storage (e.g., storage 320) of the device and provided on display 600. A user may create a mask 620 having a user created size and/or shape (e.g., by manipulating the size and/or shape of mask 620 with a joystick, a touch screen, control buttons 240 and/or keys of keypad 250). Mask 620 may be provided over a portion of image 610, as further shown in FIG. 6A.

In another implementation a user created mask (e.g., mask 620) may be created with a wand-type tool provided with typical image editing software packages (e.g., Adobe Photoshop). The user may use the wand tool to select a point in the image (or, if there is a touch screen, may touch a point in the image). The wand took may also be used to identify adjacent portions of the image that may have the same features (e.g., color, value, etc.) as the selected point in the image. Algorithms may be used to locate the edges around a selected area of the image.

Figure 6B:
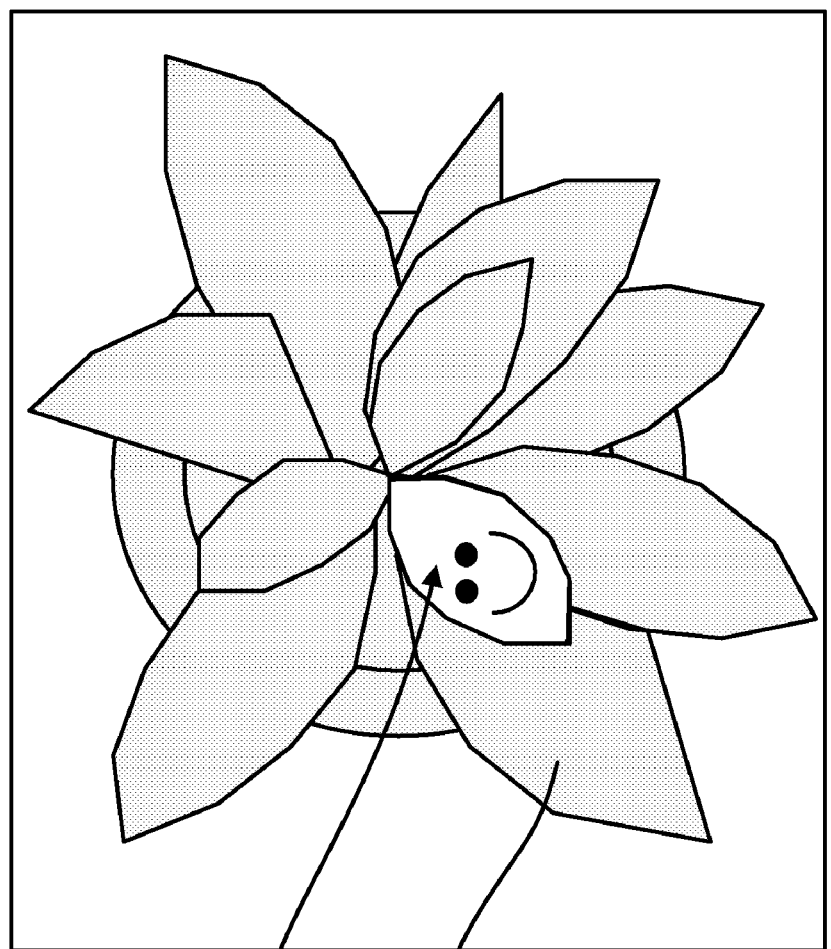

Once the user created mask (e.g., mask 620) is provided with image 610, the resulting image may be considered a custom image frame. A user may be given the options of discarding the custom image frame, storing the custom image frame (e.g., within storage 320 of device 200), and/or taking a picture using the custom image frame. If the user takes a picture using the custom image frame, a user may align user created mask 620 with a subject of the picture and capture an image of the subject. For example, as shown in FIG. 6B, user created mask 620 of the custom image frame of FIG. 6A may be aligned with the subject, and an image 630 of the subject may be captured where user created mask 620 (FIG. 6A) was originally provided. In another implementation, image 630 may be stored on the device (e.g., within storage 320 of device 200) and may be provided within user created mask 620. Image 630 may be resized and/or reshaped to fit within user created mask 620, as described above in connection with FIGS. 5A-5E.

Figure 6D:
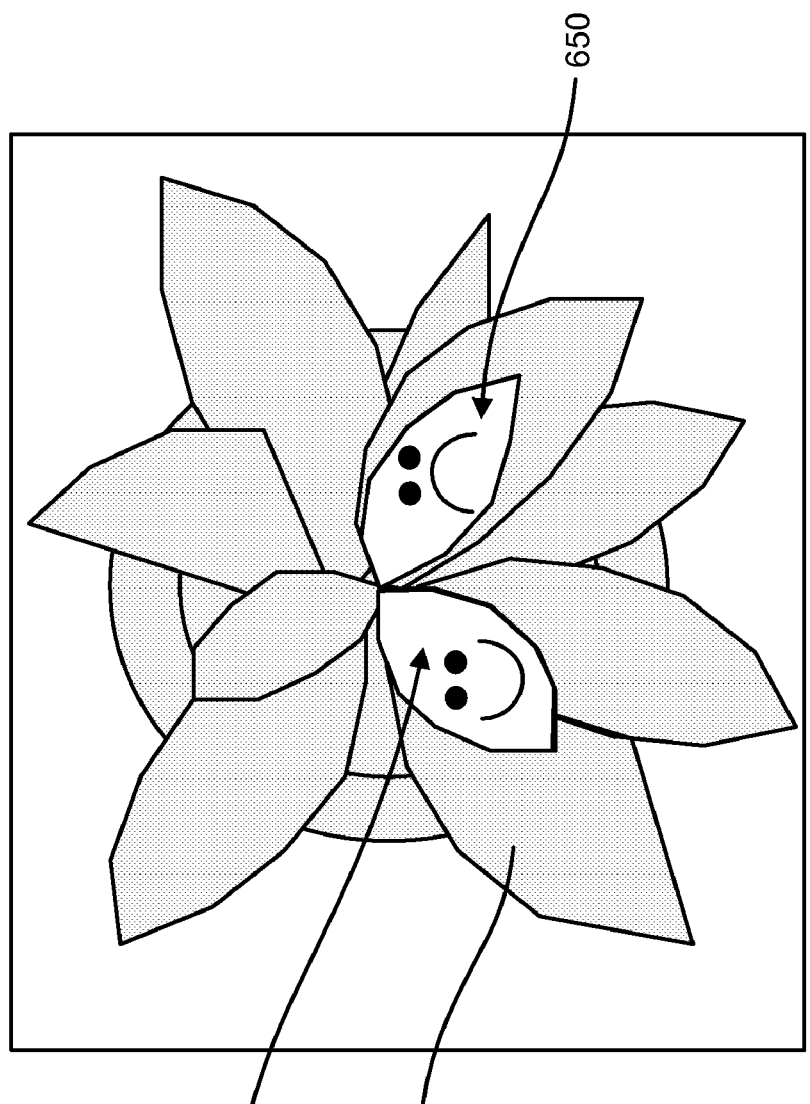

As shown in FIG. 6C, additional user created masks may be provided with image 610 of FIG. 6B. For example, a user may create a mask 640 having a user created size and/or shape (e.g., by manipulating the size and/or shape of mask 640 with a joystick, a touch screen, control buttons 240 and/or keys of keypad 250). Mask 640 may be provided over a portion of image 610, as further shown in FIG. 6C. Once the user created mask (e.g., mask 640) is provided with image 610, the resulting image may be considered a custom image frame. A user may be given the options of discarding the custom image frame, storing the custom image frame (e.g., within storage 320 of device 200), and/or taking a picture using the custom image frame. If the user takes a picture using the custom image frame, a user may align user created mask 640 with a subject of the picture and capture an image of the subject. For example, as shown in FIG. 6D, user created mask 640 of the custom image frame of FIG. 6C may be aligned with the subject, and an image 650 of the subject may be captured where user created mask 640 (FIG. 6C) was originally provided. In another implementation, image 650 may be stored on the device (e.g., within storage 320 of device 200) and may be provided within user created mask 640. Image 650 may be resized and/or reshaped to fit within user created mask 640, as described above in connection with FIG. 5C.

The implementations described above in connection with FIGS. 4A-6D may enable a user to make a custom image frame from any image, and/or may enable creation of composite images or collages, from a series of images. For example, a user may take a picture of the sky, and may provide a mask (e.g., a predetermined mask or a user created mask) within the image of the sky. The user may then take a picture of a car within the masked portion of the sky image, and may provide another mask within the composite sky/car image. The user may take a picture of a house within the masked portion of the composite sky/car image. This process may continue, and a user may elaborate the image as desired. The implementations described above in connection with FIGS. 4A-6D may further provide quick, simple, and intuitive mechanisms for users to create and use their own custom image frames.

Although the custom image frames described above in connection with FIGS. 4A-6D may be created on a single device (e.g., device 200), in one implementation consistent with principles of the invention, the custom image frames may created with and/or shared among multiple devices. For example, devices may be interconnected wirelessly (e.g., via communication interface 340 and antenna assembly 350 of device 200), and a custom image frame created on one device may be shared with other devices through the wireless interconnection. Alternatively, multiple devices may be interconnected with wires (e.g., via optical fibers), and a custom image frame created on one device may be shared with other devices through the wired interconnection.

In another example, a user may create a first custom image frame on a first device and share the first custom image frame with a user of a second device. The second device user may manipulate the custom image frame to create a second custom image frame and/or a resultant image, as described above in connection with FIGS. 4A-6D. The second custom image frame and/or resultant image may be shared with the first device user and/or users of other devices. Such an arrangement may encourage traffic among multiple devices. For example, if the devices sharing custom image frames are cellular telephones or PDAs, such an arrangement may encourage increased communication traffic, which may be beneficial to the communication service providers.

Exemplary Processes

Figure 8:
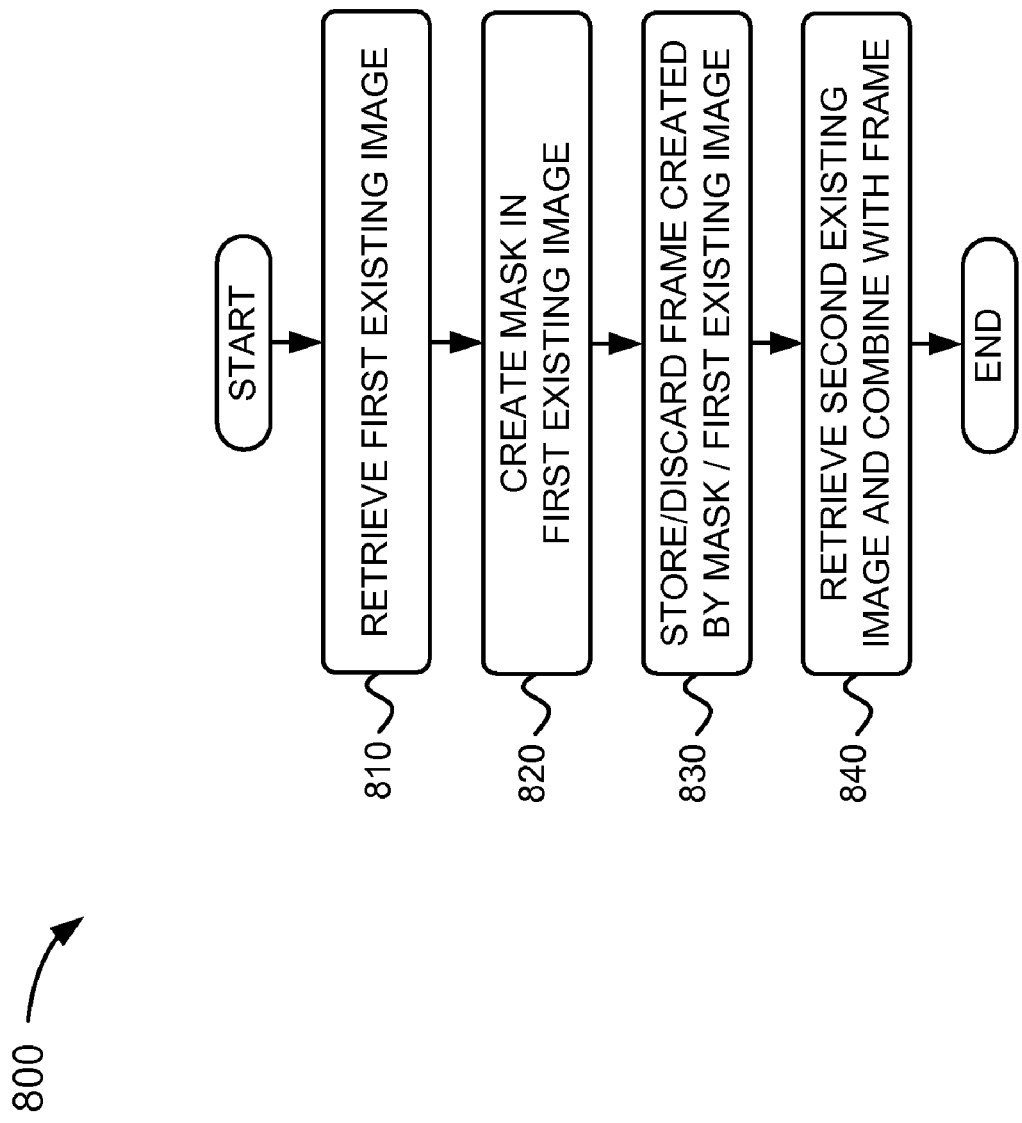

FIGS. 7 and 8 are flowcharts of exemplary processes according to implementations consistent with principles of the invention. The process of FIG. 7 may generally be described as creation of a custom image frame and resulting image with images captured by a device. The process of FIG. 8 may generally be described as creation of a custom image frame and resulting image with images stored on a device.

Process for Creation of Custom Image Frame and Resulting Image with Captured Images As shown in FIG. 7, a process 700 may identify a mask (block 710). For example, in one implementation described above in connection with FIG. 4A, display 400 may display multiple masks (e.g., masks 410-460) that may be selected for creating a custom image frame. The masks may be a variety of shapes and sizes. For example, the masks may be in the shape of an ellipse, a circle, a square, a rectangle, a triangle, a diamond, a polygon, etc. The size of each mask may be predetermined based on the size of display 400, or the size of each mask may be adjusted by the user. In another implementation described above in connection with FIGS. 6A-6D, a user may create a mask having a user created size and/or shape (e.g., by manipulating the size and/or shape of mask 620 with a joystick, a touch screen, control buttons 240 and/or keys of keypad 250).

As further shown in FIG. 7, process 700 may capture or retrieve a first image using the identified mask (block 720). For example, in one implementation described above in connection with FIGS. 4B and 4C, mask 410 may be provided over a face of an image 110 provided on display 400. Image 110 may be a representation of a subject currently being viewed and captured by a camera (e.g., camera 270) of the device. Resizing box 470 may be provided and may enable a user to enlarge or reduce the size of mask 410 to cover the desired portion of image 110 (e.g., the face of the subject).

Process 700 may store and/or discard a frame created from the first image and the mask (block 730). For example, in one implementation described above in connection with FIG. 4D, custom image frame 480 may be created from the combination of image 110 and positioned mask 410 (e.g., by taking a picture of the object with camera 270 of device 200). A user may be given the options of discarding custom image frame 480, storing custom image frame 480 (e.g., within storage 320 of device 200), and/or taking a picture using custom image frame 480.

As further shown in FIG. 7, process 700 may capture or retrieve a second image using the stored frame (block 740). For example, in one implementation described above in connection with FIG. 4D, custom image frame 480 may be combined with another image 490 (e.g., by taking another picture with camera 270 of device 200) by aligning mask 410 with image 490 to create a final image. Custom image frame 480 may be used to create additional images in a similar way pre-stored frames are used to create images. Once image 490 is combined with customer image frame 480, a user may be given the options of saving the resulting image and/or attempting to capture a different image to be combined with custom image frame 280.

Process for Creation of Custom Image Frame and Resulting Image with Existing Images As shown in FIG. 8, a process 800 may retrieve a first existing image (block 810). For example, in one implementation described above in connection with FIG. 6A, display 600 of a device (e.g., display 230 of device 200) may display image 610. In one implementation, image 610 may be retrieved from storage (e.g., storage 320) of the device and provided on display 600.

Process 800 may create a mask in the first existing image (block 820). For example, in one implementation described above in connection with FIG. 6A, a user may create mask 620 having a user created size and/or shape (e.g., by manipulating the size and/or shape of mask 620 with a joystick, a touch screen, control buttons 240 and/or keys of keypad 250). Mask 620 may be provided over a portion of image 610. In another implementation, a user may select a preexisting mask and alter the size of the mask, as described above in connection with FIG. 4C.

As further shown in FIG. 8, process 800 may store and/or discard a frame created from the first existing image and the mask (block 830). For example, in one implementation described above in connection with FIG. 6A, once the mask (e.g., mask 620) is provided with image 610, the resulting image (e.g., the combination of image 610 and mask 620) may be considered a custom image frame. A user may be given the options of discarding the custom image frame, storing the custom image frame (e.g., within storage 320 of device 200), and/or taking a picture using the custom image frame.

As further shown in FIG. 8, process 800 may retrieve a second existing image and combine the second existing image with the stored frame (block 840). For example, in one implementation described above in connection with FIG. 6B, image 630 may be stored on the device (e.g., within storage 320 of device 200) and may be provided within mask 620. Image 630 may be resized and/or reshaped to fit within mask 620, as described above in connection with FIGS. 5A-5E.

CONCLUSION

Implementations consistent with principles of the invention may relate to custom image frame creation with a device. In one implementation, a user may be provided with a quick, simple, and reliable mechanism for creating custom image frames with a device. For example, a user may select a mask to use for image frame creation, and may use device to retrieve an image from storage or from another mechanism (e.g., by taking a picture). A portion of the retrieved image may be masked with the selected mask to permit a user to create a custom image frame from the retrieved image and the mask. The custom image frame may be stored (e.g., in a storage medium of device), and may be used to create additional images in a similar way pre-stored frames are used to create images. In another implementation, a mask may be created in an existing image, and the resulting image may be a first custom image frame. The first custom image frame may be shared with multiple users, and manipulated by each additional user to create a collaborative custom image frame and/or custom image.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7 and 8, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    capturing, by a first device, a first image;
    accepting, by the first device, a first user input that specifies a point within the first image;
    defining, by the first device, a first mask in an irregular portion of the first image based on the first user input received at the device and without additional input from a user associated with the device, wherein the first user input specifies a point within the first image, and wherein the defining further includes:
        identifying, areas of the first image that are adjacent to the specified point and that share image features, including color, with the specified point;
    forming, by the first device, a first image frame that includes the first image and the first mask;
    aligning, by the first device, a subject of a second image with the first mask in the first image frame;
    capturing, by the first device, the second image; and
    applying, by the first device, the second image to the first image frame, including automatically resizing and reshaping the second image, without input from the user, to conform to the second mask.

2. The method of claim 1, where the first user input identifies a plurality of differing irregular portions of the first image,
    where defining the first mask includes defining a plurality of first masks, each of the plurality of first masks associated with a corresponding one of the plurality of differing irregular portions of the first image,
    where the first image frame includes the first image and the plurality of first masks.

3. The method of claim 2, further comprising:
    acquiring a plurality of second images;
    dynamically applying each of the plurality of second images to a corresponding one of the plurality of first masks; and
    creating a composite image from the first image frame, the second image, and the plurality of second images.

4. The method of claim 3, where dynamically applying each of the plurality of second images to the corresponding one of the plurality of first masks further includes:
    automatically resizing and reshaping each of the plurality of second images, without input from the user, to fit within the corresponding one of the plurality of first masks.

5. The method of claim 1, further comprising
    transmitting, by the first device, the first image frame to a second device, where the second device forms a second image frame that includes the first image, the first mask, and a second mask in another irregular portion of the first image, where the second image frame is formed by manipulating, by the second device, the first image frame to include the second mask, and where the second mask is positioned within the first mask;
    receiving, at the first device, the second image frame from the second device;
    aligning, by the first device, a subject of a third image with the second mask in the second image frame;
    capturing, by the first device, the third image; and
    applying, by the first device, the third image to the second image frame, including automatically resizing and reshaping the third image, without additional input from a user of the first device, according to the second mask.

6. The method of claim 5, further comprising:
    storing the second image frame in the first device.

7. A device comprising:
    acquiring means for acquiring a first image and a second image;
    forming means for forming a first mask in an irregular portion of the first image based on a user input received at the device and without additional input from a user associated with the device, where the user input specifies a point within the first image, and where the forming means includes:
    determining means for determining regions of the first image that are adjacent to the specified point and that share image features, including color, with the specified point, and an edge, of the irregular portion of the first image, that surrounds the determined regions and the point within the first image;
    creating means for creating a first image frame from the first image and the first mask;
    applying means for applying the second image to the first image frame, including automatically resizing and reshaping the second image, without input from a user, according to the second mask; and
    storing means for storing the first image frame and the second image as applied to the first image frame.

8. The device of claim 7, further comprising:
    transmitting means for transmitting the first image frame to another device;
    receiving means for receiving, from the other device, a second image frame, where the second image frame includes the first image, the first mask, and a second mask in another irregular portion of the first image, where the second image frame is formed, in the other device, by manipulating the first image frame to include the second mask;

means for capturing a third image;

applying means for applying the third image to the second image frame, including automatically resizing and reshaping the third image, without input from a user, according to the second mask; and storing means for storing the second image frame and the third image as applied to the second image frame.

9. A device comprising:

a memory to store instructions; and a processor to execute the instructions to:

retrieve a first image, create a first mask in an irregular portion of the first image based on a single user input received at the device, where the single user input specifies a point within the first image, and where the processor, when creating the first mask, is further to:

identify areas of the first image that are adjacent to the specified point and that share image features, including color, with the specified point, and determine an edge of the irregular portion of the first image to include the specified point and the identified areas, create a first image frame from the first image and the first mask, capture a second image, and dynamically apply the second image to the first image frame, including automatically resizing and reshaping the second image, without additional input from a user, according to the first mask.

10. The device of claim 9, where the processor is further to:

transmit the first image frame to another device, receive, from the other device, a second image frame, where the second image frame includes the first image, the first mask, and a second mask in another irregular portion of the first image, where the second image frame is formed, in the other device, by manipulating the first image frame to include the second mask, store the second image frame, capture a third image, and dynamically apply the third image to the second image frame, including automatically resizing and reshaping the third image, without input from a user, according to the second mask.

11. The device of claim 9, where the first mask includes a plurality of first masks, each of the plurality of first masks being associated with a corresponding one of a plurality of differing irregular portions of the first image, the plurality of differing irregular portions of the first image being defined by the user input, where the first image frame includes the first image and the plurality of first masks.

12. The device of claim 11, where the processor is further to execute the instructions to:

acquire a plurality of second images, provide each of the plurality of second images within a corresponding one of the plurality of first masks, and create a composite image from the first image frame, the second image, and the plurality of second images.

13. The device of claim 12, where the processor, when providing each of the second images within the corresponding one of the plurality of first masks, is further to execute the instructions to:

automatically resize and reshape each of the plurality of second images, without input from the user, to fit within the corresponding one of the plurality of first masks.

* * * * *